Figure 1:
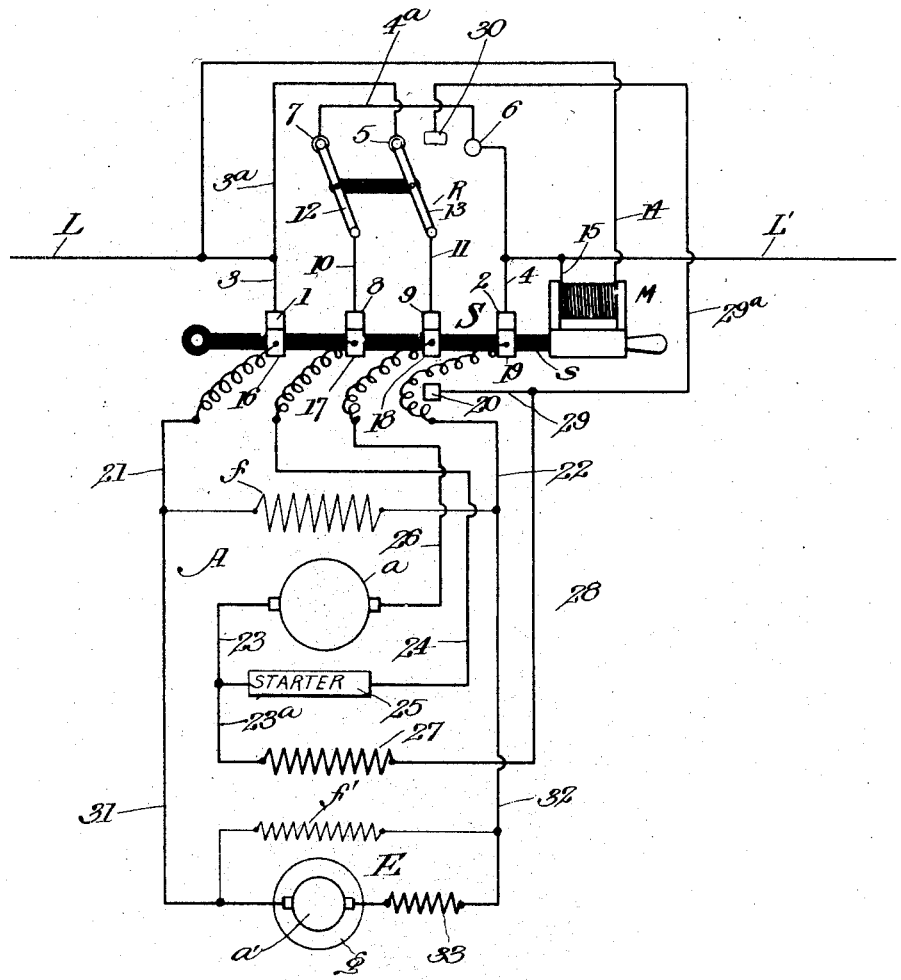

W. T. HOLMES AND G. H. WHITTINGHAM.
MOTOR CONTROLLER.
APPLICATION FILED FEB. 8, 1918.

1,411,700.

Patented Apr. 4, 1922.
2 SHEETS—SHEET 1.

Inventors
W. T. Holmes
G. H. Whittingham
By
Watson Boyden
Attorneys

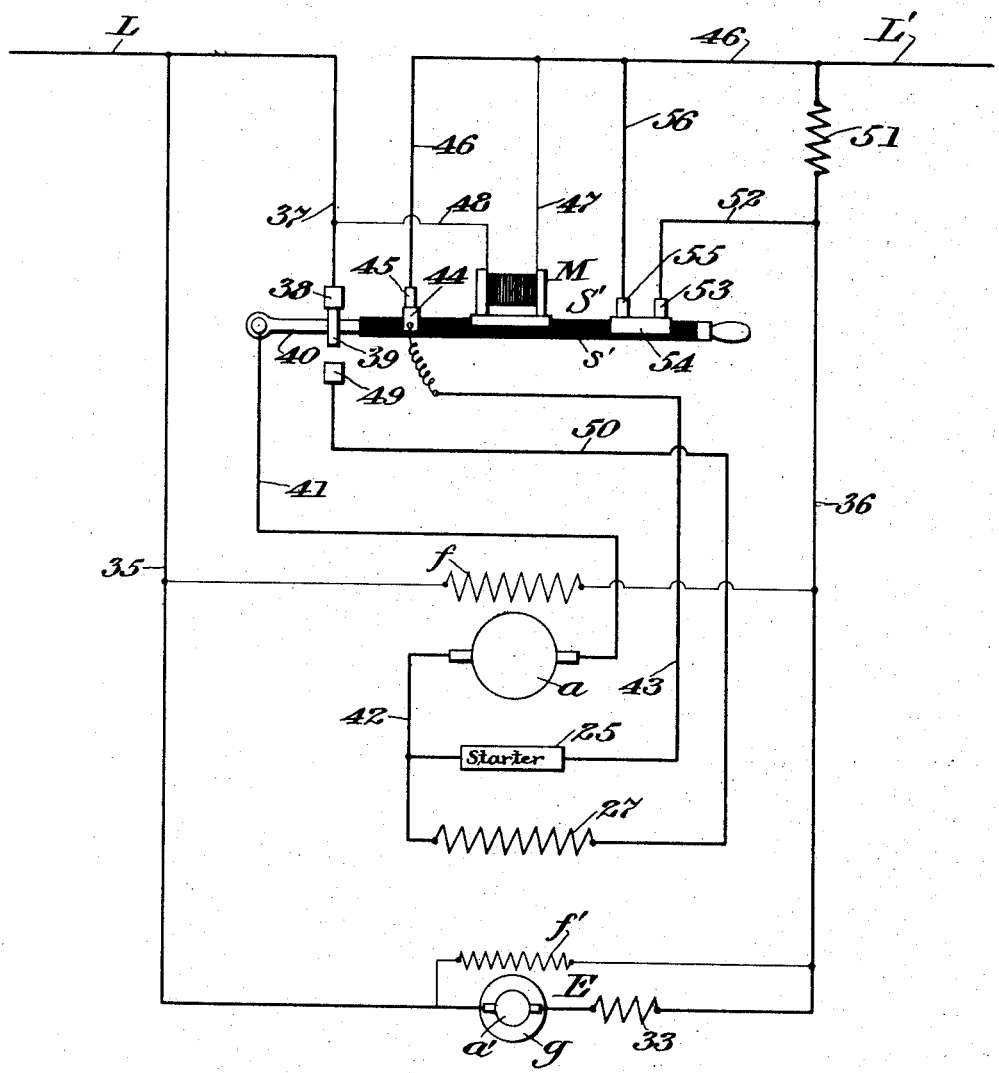

UNITED STATES PATENT OFFICE.

WILLIAM T. HOLMES, OF BALTIMORE, AND GEORGE H. WHITTINGHAM, OF BANCROFT PARK, MARYLAND, ASSIGNORS TO MONITOR CONTROLLER COMPANY OF BALTIMORE, A CORPORATION OF MARYLAND.

MOTOR CONTROLLER.

1,411,700.  Specification of Letters Patent.  Patented Apr. 4, 1922.

Application filed February 8, 1918. Serial No. 216,082.

*To all whom it may concern:*

Be it known that we, WILLIAM T. HOLMES and GEORGE H. WHITTINGHAM, citizens of the United States, residing at Baltimore, Maryland, and Bancroft Park, in the county of Baltimore and State of Maryland, respectively, have invented certain new and useful Improvements in Motor Controllers, of which the following is a specification.

Where direct current electric motors are employed for work requiring frequent reversal of the motor, it is common to provide the motor with a dynamic brake circuit for causing the motor to quickly slow down prior to reversal of the current in the armature circuit of the motor. In order to utilize the dynamic brake, it is necessary to maintain the field strength of the motor for a time sufficient, at least, to permit the motor with its load to slow down. This is usually accomplished by keeping the shunt field winding of the motor connected to the supply circuit, thus maintaining a permanent field. There are occasions, however, due to various conditions on the line or in the power station, when the voltage on the supply circuit drops considerably or fails entirely, and in such cases the motor field becomes weakened or de-energized and the dynamic brake fails to work, and injury to the machinery operated by the motor results. Thus, in the operation of large planers, where the motor reverses at the end of each movement of the planer table, if a dynamic brake is depended upon to slow the motor down prior to reversal, and the potential of the supply circuit fails, the braking action also fails and injury to the planer mechanism is liable to result.

The purpose of the present invention is to provide means whereby, if the voltage of the supply circuit falls below a pre-determined point, or fails entirely, or if the motor is purposely disconnected from the supply circuit, the field of the motor will, nevertheless, be energized from an independent source for a sufficient length of time to permit the dynamic brake to act. In carrying out our invention, we provide a small dynamo electric machine, preferably a small shunt wound motor, which will operate as a generator, and connect the armature of this generator in parallel with the shunt field of the work motor to the supply circuit and allow the generator to run idly as a motor. If, for any reason, the voltage of the supply circuit at the terminals of the shunt field of the work motor falls considerably, or entirely fails, the idle motor, by reason of its inertia, will continue to run as a generator and supply current to the shunt field of the work motor for a sufficient time to permit the latter to generate its own braking current. We also provide a switch, which, in its closed position, connects the work motor operatively to the supply circuit, and in its open position, disconnects the armature of the work motor and closes the dynamic brake circuit. This switch is held in its closed position, while the machines are in operation, by a voltage magnet having its windings connected across the supply circuit, but upon a pre-determined drop in voltage in the supply circuit the magnet releases the switch, which opens automatically, preferably disconnecting both the work motor and generator from the supply circuit and closing the dynamic brake circuit. It is desirable that the switch should open instantly and close the dynamic brake circuit if the voltage of the supply circuit fails; but as the terminals of the generator are connected to the supply circuit directly or through the switch and hence to the terminals of the magnet, the current generated by the generator will circulate through the magnet coils and cause the latter to hold the switch in closed position for a time if the electro-motive force of the generator approximates the normal line voltage. In order to avoid this contingency, we proportion the magnet so that it will release the switch upon a pre-determined drop in voltage on the line, and we provide sufficient resistance in the armature circuit of the generator to prevent it from generating a counter E. M. F. equal to the minimum voltage required at the terminals of the magnet to hold the switch closed. Preferably, we supply the generator with a fly wheel in order that it may have sufficient inertia to continue operating as a generator, after being disconnected from the supply circuit, long enough to energize the field of the main or working motor while the latter with its load is slowing down.

In the accompanying drawing,

Fig. 1 is a diagrammatic view illustrating our invention in connection with a reversing switch and a switch which disconnects all of the motor and exciter circuits from the supply circuit, upon failure of voltage; and, Fig. 2 is a similar view, omitting the reversing switch, and showing an arrangement by which only the armature circuit of the work motor is disconnected from the supply circuit upon failure of voltage.

Referring to Fig. 1 of the drawing, L and L' indicate the supply wires leading from a suitable current source, and A indicates the working motor comprising the armature $a$ and shunt field winding $f$. The motor is shown connected to the supply circuit through a switch S, and a reversing switch R, for reversing the direction of current through the motor armature, is also shown. The switch S comprises stationary contacts 1 and 2, which are connected directly to the supply wires by conductors 3 and 4. The conductor 3 also leads to contact 5 of the reversing switch, and the conductor 4 leads to contacts 6 and 7 of the reversing switch. The switch S is also shown with two contacts, 8 and 9, which are connected by conductors 10 and 11 to the arms 12 and 13, respectively, of the reversing switch. A holding magnet M is provided for holding the switch S in its closed position, as shown in the drawing, and this magnet has high resistance coils connected at one end to the supply wire L by conductor 14, and at the other end to supply wire L' by conductor 15. The magnet is proportioned so that it will hold the switch in closed position so long as the potential on the line or supply circuit is normal and until the potential falls to a pre-determined amount, say 20%, below the normal, when the magnet will release the switch arm $s$, and said arm will drop and open the switch. The switch arm is provided with contacts 16, 17, 18, and 19, adapted to engage the fixed contacts 1, 8, 9, and 2, respectively, when the switch is closed. When the switch arm drops open, the engagement between these several contacts is broken and the contact 18 then engages a contact 20 in the dynamic brake circuit of the motor.

The shunt field $f$ of the work motor A is connected, as shown, by conductors 21 and 22 to movable contacts 16 and 19, respectively, on the switch arm $s$, and when said arm is closed, this field is connected to the supply circuit through contacts 1 and 2 and conductors 3 and 4. When the switch S is open, the shunt field $f$ is dis-engaged from the supply circuit. One brush of the armature $a$ of the work motor is connected by conductors 23 and 24 through starter 25 to the movable contact 17 of the switch S, and the other brush of said armature is connected by conductor 26 to the movable contact 18 on the switch S. When the switch S is closed, the contacts 17 and 18 are connected to the supply circuit through the reversing switch. In the position in which the arms of the reversing switch are shown in the drawing, the contact 17 is connected to side L' of the supply circuit through conductor 10, arm 12, contact 7, and conductor $4^a$, and the contact 18 is connected to the side L through contact 9, conductor 11, switch arm 13, contact 5, and conductor $3^a$. By following the circuits just traced, it will be evident that in the position in which the reversing switch arms are shown, when the switch S is closed, current will flow from the side L' of the supply circuit through conductors $4^a$, 10, 24, starter 25, and conductor 23 to the armature $a$, and thence through conductors 26, 11, and $3^a$, to the side L of the supply circuit. When the reversing switch arms are swung to the right, the arm 13 will engage the contact 6 and the arm 12 will engage the contact 5, and the direction of current through the armature $a$ will be reversed, as will be obvious without tracing the circuits further.

The dynamic brake circuit of the motor A extends from one brush of said motor through conductors 23 and $23^a$ to a brake resistance 27, thence through conductors 28 and 29 to the contact 20. From the conductor 29 a branch conductor $29^a$ leads to the contact 30 on the reversing switch midway between the contacts 5 and 6.

When the switch S is open, the dynamic brake circuit is closed at the contacts 18 and 20, that is, the circuit of the armature $a$ is then closed upon itself through the brake resistance 27. The switch S, however, is always held in its upper or closed position, while the motor is in operation and the voltage on the line L, L' is normal, and the dynamic brake circuit is only closed at the contacts 18 and 20 when the voltage drops sufficiently to cause the magnet M to release the switch arm $s$.

The reversing switch is ordinarily operated automatically by the machine which the motor drives. Thus, in the operation of a planer, a tappet on the planer table may be used to operate the reversing switch near the completion of each movement of the table. As the reversing switch is moved from the position shown in the drawing over to the right hand position, it first dis-connects the armature $a$ from the supply circuit and then the arm 13 engages the contact 30 and closes the dynamic brake circuit at this point, causing the motor to slow down. The arm 13 then interrupts the dynamic brake circuit and moves on to the contact 6 while the arm 12 engages the contact 5 and the current from the supply circuit is then directed through the armature $a$ in the reverse direction. Similarly, when the reversing switch arms are moved from right to left, the connection to the supply circuit is first broken, then the dynamic brake circuit is made up and broken, and then the armature is connected to the supply circuit and the current flows in the opposite direction through the armature. Thus, there is a braking action before each reversal of the current in the armature circuit. The reversing switch is shown conventionally. In practice, it will be understood that this switch will be arranged so that the dwell of the arm 13 on the contact 30 will be for a sufficient length of time to allow the full braking effect to take place.

So long as the voltage on the line is normal, the switch S remains closed and the field winding $f$ of the work motor remains connected to the supply circuit and receives full voltage. In case of failure of voltage on the line, however, or a large drop in voltage, if the field $f$ remained connected to the line, it would be de-energized or so weakened that the armature $a$ would not generate the necessary braking current to slow down the motor upon the operation of the reversing switch. To overcome this difficulty, upon a pre-determined drop in voltage or failure of voltage on the line, the magnet M releases the switch arm $s$ and the armature and shunt field circuits of the motor A are thereby automatically dis-connected from the supply circuit and thereupon the dynamic brake circuit is closed at the contacts 18 and 20, and the field $f$ is energized from a separate source until the motor has been slowed down by its own dynamic braking action. This separate source of current for the field comprises a small exciter E, which may be, and preferably is, a relatively small shunt wound motor comprising an armature $a'$ and a shunt field winding $f'$, the armature circuit of this small motor being connected through conductors 31 and 32 to the terminals of the field $f$ of the work motor A, and thence to the switch contacts 16 and 19, by conductors 21 and 22, respectively. When the switch S is closed, it will be evident that the field $f$ of the work motor and the armature $a'$ of the small exciter will be connected in parallel with one another and to the source of supply. The field $f''$ of the machine E is also connected to the supply circuit by way of conductors 31—32. Preferably, the armature of the machine E is provided with a fly wheel $g$, in order that the armature may have considerable inertia, to keep the machine in operation after the circuits have been disconnected from the supply circuit.

It will be evident that while the main motor A is running with the switch S closed, the dynamo electric machine E will also operate as a motor, and the operation of the latter will not be affected by the movements of the reversing switch; but upon failure of voltage in the supply circuit, both machines will be immediately dis-connected from said circuit by the opening of the switch S, and the machine E, then acting as a generator, will furnish current at suitable voltage to keep the field $f$ energized while the main motor A is coming to a stop through the action of the dynamic brake, the brake circuit being then closed at the contacts 18 and 20. If the counter E. M. F. of the machine E closely approximated the voltage of the supply circuit, the switch S would not fall open immediately upon the failure of voltage in the supply circuit because the brushes of the machine E are connected through the switch to the supply circuit and to the terminals of the coil of magnet M, and the current generated by the machine E would energize the magnet and cause it to hold the switch closed, and the dynamic brake circuit of the motor would be kept open at the contacts 18 and 29, so that the dynamic brake could not act. To prevent this, a dead resistance 33 is placed in series with the armature of the machine E to cut down the voltage supplied by it to the terminals of the magnet M to the point where the current supplied by said machine will not cause the magnet to support the switch arm. Thus, if the magnet M is proportioned so that it will release the switch arm upon a drop of 20% in the voltage of the supply circuit, the voltage supplied by the machine E at the terminals of the magnet coils should be at least 20% lower than the normal line voltage, and this is regulated by placing the external resistance 33 in the armature circuit of the machine E, or the machine, which is small, may be wound with sufficient internal resistance for the purpose. This resistance, either internal or external, is also necessary in order to prevent injury to the machine when it is started as a motor. Of course, the voltage supplied by the machine E at the terminals of the shunt field coil $f$ of the motor A will be less than the line voltage, but sufficient to maintain a strong field during the braking action.

It will be seen that the generator E will run continuously and idly as a motor so long as conditions on the supply circuit are normal, and that it is only in case of abnormal conditions resulting in failure of voltage in the supply circuit, or a very considerable drop in voltage, that this idle running motor becomes a generator and supplies current to the field of the working motor. A motor-driven generator, operated from the supply circuit, might be employed for supplying current to the field of the work motor, after failure of voltage on the supply circuit; but an ordinary shunt wound motor is also a satisfactory generator and we prefer to use it as a means for exciting the field of the main motor when the voltage on the supply circuit fails.

In Fig. 2 of the drawing, we have shown the invention without the reversing switch, and in this view also the circuits of the work motor and the idle motor or generator are shown connected directly to the supply circuit, with the exception of the armature circuit of the work motor which is connected through the electromagnetically controlled switch to the supply circuit. It is not necessary to the operation of the invention that any of the connections to the supply circuit shall be broken, upon failure of voltage, except the armature circuit of the work motor, which must be broken, in order to close the dynamic brake circuit.

In Fig. 2, the idle motor or generator E is connected to the side L of the supply circuit by conductor 35 and to the side L' by conductor 36, and the shunt field $f$ of the work motor is shown connected to said conductors 35 and 36. Thus, said shunt field is connected to the terminals of the generator E, and said shunt field and generator are connected in parallel with one another directly to the supply circuit. The switch S' is shown in the position which it occupies when the line voltage is normal and the motor is in operation. In this position, the armature $a$ of the work motor receives current from the side L of the supply circuit through conductor 37 to fixed contact 38, thence through contact 39 on the switch, and thence through the metal part 40 of the switch arm to the armature conductor 41, thence through the armature to conductor 42, thence through starter 25 and conductor 43 to insulated contact 44 on the switch, and thence through stationary switch contact 45 and conductor 46 to the side L' of the supply circuit. The switch S' is held in its closed position, while the voltage is normal, by the magnet M having its coils connected by conductors 47 and 48 to supply wires L' and L, respectively. When the switch S' opens, upon failure of voltage, the contact 40 on the switch arm engages the contact 49 of the dynamic brake circuit. As shown, this contact is connected by conductor 50, through brake resistance 27 and conductor 42 to one brush of the armature $a$. The other brush of said armature is connected by conductor 41 to the metal part 40 of the switch arm, on which the contact 39 is secured, and hence, when the contact 39 is in engagement with the contact 49 the armature will be on a closed circuit which includes the brake resistance. In this position of the arm, the connection between the supply circuit and the armature will be broken at the contacts 38 and 45. In the conductor 36 is arranged a protective resistance 51, which is normally bridged or shunted through a switch operated by the switch arms $s'$. As shown, a conductor 52 leads from the conductor 36 at a point between the armature of the small generator E and the protective resistance 51, to the fixed contact 53, which is engaged by a contact 54 on the switch arm. Another stationary contact 55 engages the contact 54 and this contact 55 is connected by conductors 56 and 46 to the supply wire L'. Thus, when the switch is closed, the protective resistance 51 is shunted; but when the switch drops open the resistance 51 is in series with the armature of the small generator.

In operation, while the line voltage is normal, the switch S' remains closed, as shown in the drawing. Upon failure of voltage, the magnet M releases the switch arm, which drops to open position and closes the dynamic brake circuit. The generator E' which runs idly as a motor when the switch is closed, operates as a generator when the switch is opened and supplies current to the field $f$, long enough to allow the dynamic brake to act. With the idle motor or generator connected directly to the supply circuit, as shown in Fig. 2, so that it is not cut off therefrom when the voltage fails, the generator might be short-circuited through other translating devices on the supply circuit, which would be left connected thereto upon failure of voltage. In order to prevent this occurrence, the protective resistance 51 is provided in series with the generator E; but this resistance is normally short-circuited through the switch and is thrown in series with the generator, by the opening of the switch, only in case of failure of voltage or such a sudden drop in voltage as would cause the magnet M to release the switch arm.

What we claim is:

1. The combination with a motor having a shunt field winding, of a supply circuit, a dynamic brake circuit, switching mechanism adapted, in one position, to connect the armature of the motor to the supply circuit, and in another position to close the dynamic brake circuit, a retaining device adapted to hold the mechanism in the first mentioned position while the voltage in the supply circuit is normal and to release the mechanism and cause the closure of the brake circuit when the voltage drops to a predetermined value below normal, and means for supplying current to the shunt field of said motor, independently of the supply circuit, at a pressure insufficient to prevent the magnet from releasing the switch when the line voltage falls to said predetermined value.

2. The combination with a motor having a shunt field winding, of a supply circuit, a dynamic brake circuit, a switch adapted, in one position, to connect the armature of the motor to the supply circuit, and in another position to close the dynamic brake circuit, a magnet, connected to the supply circuit, adapted to hold the switch in the first mentioned position while the voltage in the supply circuit is normal and to release the switch and cause the closure of the brake circuit when the voltage drops to a predetermined value below normal, and a generator, normally operated idly from the supply circuit, adapted to supply current to the shunt field of said motor at a pressure insufficient to prevent said magnet from releasing the switch when the line voltage falls to said predetermined value.

In testimony whereof we have affixed our signatures.

WILLIAM T. HOLMES.
GEORGE H. WHITTINGHAM.